E. SCHMIEDT.
GAS PURIFYING APPARATUS.
APPLICATION FILED MAR. 24, 1909.
955,915.
Patented Apr. 26, 1910.
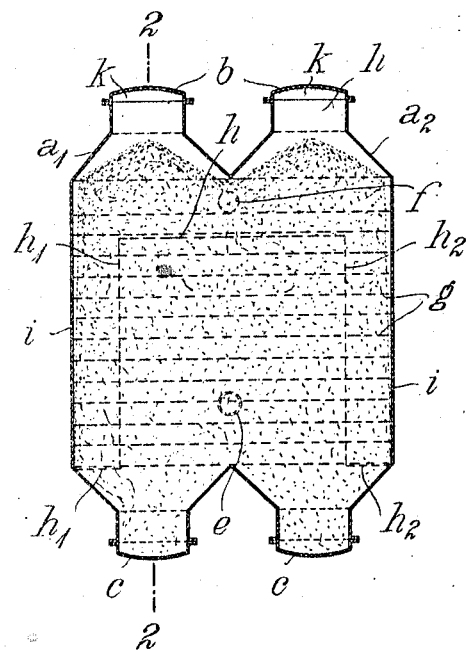
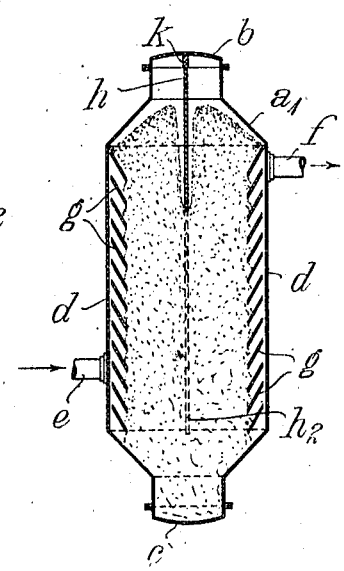
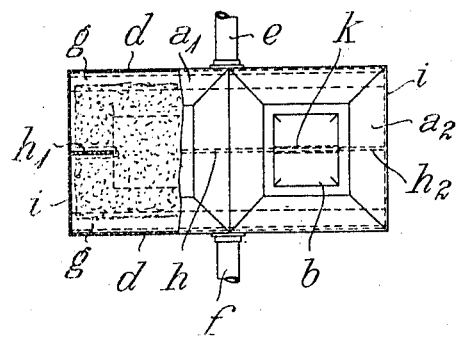
Witnesses:
John A. Stebenbeck
John Lotka
Inventor:
Ernst Schmiedt
by Biesen & Knauth
Attorneys

UNITED STATES PATENT OFFICE.

ERNST SCHMIEDT, OF ASCHAFFENBURG, GERMANY.

GAS-PURIFYING APPARATUS.

955,915.

Specification of Letters Patent.   Patented Apr. 26, 1910.

Application filed March 24, 1909.   Serial No. 485,532.

*To all whom it may concern:*

Be it known that I, ERNST SCHMIEDT, of Aschaffenburg, Germany, have invented certain new and useful Improvements in Gas-Purifying Apparatus, of which the following is a full, clear, and exact description.

This invention relates to purifying apparatus for combustible gases, such as illuminating gas, of the type comprising one or more casings having closed tapering ends within which louvers are provided where the gas enters and leaves each casing thus insuring the most uniform distribution of the gas possible throughout the purifying mass.

Gas admitted into such purifiers tends to pass by the most direct route from the louver at the gas inlet which extends throughout the height of the purifier, to the louver at the gas outlet. As the purifying material in the casing is in contact with all the inner walls of the casing which are not provided with louvers, the gas is forced to traverse the whole purifying material.

It has been found that the purifying material is only in proper contact with the inner walls of the tower when the latter is first brought into operation, but that after it has been working a short time, owing to fritting and settling, spaces or clearances are formed both at the top of the purifier and at its lateral walls, so that the gas to be purified passes directly from inlet to outlet. Efficient working of the purifier is thus considerably hampered, as large quantities of gas pass through the purifier without being purified, or after having been purified only to an insufficient extent. According to this invention this drawback is obviated by providing between the louvers at the inlet and outlet of the gas, upright baffle plates which adjoin the upper and lateral walls of the casing and project into the purifying material in such a manner that they make it impossible or render it very difficult, for gas to pass direct from the inlet to the outlet, even if there be clearances or free spaces between the walls of the tower and the purifying material.

In the accompanying drawing, in which similar letters denote similar parts, Figure 1 is a vertical longitudinal section through the purifying apparatus. Fig. 2 a cross section on line 2—2 of Fig. 1 and Fig. 3 a plan partly in cross section of Fig. 1.

The apparatus illustrated comprises two casings or towers $a_1$, $a_2$ connected together and tapering at their upper and lower ends, each tower being provided at its upper end with a cover $b$ for filling or charging, and with a removable bottom $c$ for emptying or discharging the apparatus. In the lower part of one side wall $d$ which may be of rectangular cross section is arranged the gas inlet pipe $e$, while the gas outlet pipe $f$ is connected to the opposite side wall $d$. The two side walls $d$ are provided in the well-known manner with louvers $g$ by means of which the gas is distributed throughout the whole cross sectional area of the tower as it enters and before escaping.

Between the two louvers $g$ is arranged an upright partition or baffle plate the upper portion $h$ of which extends across the two towers $a_1$, $a_2$, and fits closely against the inner walls of the upper part of the towers, while the two end portions $h_1$, $h_2$ extend downward from the main baffle $h$ and are connected to the transverse walls $i$ at right angles thereto. The baffle $h$, $h_1$, $h_2$ projects from the top of the tower below the lowest louver $g$, and from the transverse walls $i$ a short distance into the purifying material as will be seen from the drawing. If the upper covers $b$ of the purifier are arched, they must be provided with ribs $k$ which, when the covers are closed, fit tightly against the upper edge of the baffle.

If, after the charging of the purifier, fritting or settling of the purifying material takes place during working, no portion of the unpurified gas entering through the pipe $e$ can pass direct to the outlet pipe $f$ through the intervals or free spaces which may have been formed, but all the impure gas is forced to flow around the baffle $h$, $h_1$, $h_2$. The gas has consequently to pass through the purifying material between the baffle $h$, $h_1$, $h_2$ and the outlet, whence it therefore issues in a purified state.

It will be understood that instead of the above mentioned partition or baffle, several partitions arranged side by side in the purifier may be used if desired. These partitions must be upright so that they will not interfere with the automatic emptying of the purifier when the bottom $c$ is removed.

The portion $h$ of the baffle plate in the upper portion of the purifier can be separate from the lower portions $h_1$, $h_2$ which are connected to the transverse walls $i$ of the purifier, in which case these lower portions $h_1$, $h_2$ must intersect the upper portion $h$ in order to prevent any direct passage of non-purified gas to the outlet through any gaps existing between the purifying material and the walls of the tower.

What I claim is:—

1. In a gas-purifier, a container for the purifying material, having opposite louvers for the inflow and outflow of gas respectively, and an upright baffle arranged between said louvers and extending along the side walls of the containers continuously throughout the entire height of the louvers.

2. In a gas-purifier, a container for the purifying material, having opposite louvers, side walls extending from one louver to the other, and an upright baffle plate having an upper portion extending entirely across from one side wall to the other between said louvers, and spaced extensions ranging continuously downward along said side walls to the level of the lowermost louvers.

3. In a gas-purifier, a container for the purifying material, having opposite louvers, side walls extending from one louver to the other, and an upright baffle plate which extends from a portion of one side wall, between the louvers, to a portion of the other side wall, likewise between the louvers.

4. In a gas-purifier, a container for the purifying material, having opposite louvers, side walls extending from one louver to the other, an upright baffle plate extending from one side wall to the other, and a cover having an interior rib to engage the upper edge of the baffle plate.

5. In a gas-purifier, a container having opposite apertured walls for the inflow and outflow of gas respectively, side walls extending from one apertured wall to the other, and an upright baffle plate extending from a portion of one side wall, between said apertured walls, to a portion of the other side wall, likewise between the said apertured walls.

6. In a gas-purifier, a container having opposite apertured walls for the inflow and outflow of gas respectively, side walls extending from one apertured wall to the other, and an upright baffle plate, substantially parallel to said apertured walls, located between them and extending from one of the side walls to the other.

In testimony whereof I hereunto affix my signature in the presence of two witnesses.

ERNST SCHMIEDT.

Witnesses:
JEAN GRUND,
CARL GRUND.